Thomas D. Nast and Richard G. Wooldridge
INVENTORS

United States Patent Office 3,445,285
Patented May 20, 1969

3,445,285
METHOD AND APPARATUS FOR CLEANING WELDING WIRE
Thomas D. Nast, White Plains, N.Y., and Richard G. Wooldridge, Glastonbury, Conn., assignors to All-State Welding Alloys Co., Inc., White Plains, N.Y., a corporation of New York
Original application Sept. 27, 1963, Ser. No. 312,221, now Patent No. 3,210,838, dated Oct. 12, 1965. Divided and this application Jan. 21, 1965, Ser. No. 435,771
Int. Cl. B08b 7/04, 3/10
U.S. Cl. 134—9                    10 Claims

ABSTRACT OF THE DISCLOSURE

Method and apparatus for processing welding wire, particularly for cleaning the surface of the same wherein the wire is washed with a detergent solution, rinsed with an inert liquid, wiped, dried in an inert gas stream, washed with a grease solvent solution, wiped and subjected to another inert gas stream and again wiped, this last wiping being effected with a pair of fabric tapes moving both axially of the wire and circumferentially thereof. The fabric tapes are moved in engagement with opposite peripheral portions of the wire in a direction opposite the direction in which the wire is being moved through the wiping station and the fabric tapes are twisted during their engagement with the welding wire. A first pair of reels is rotatably mounted about a first pair of parallel axes and a second pair of reels is rotatably mounted about a second pair of parallel axes, the second pair of axes being disposed substantially perpendicularly to the first pair of axes. A first tape extends between one reel of the first pair and one reel of the second pair and a second tape extends between the other reel of the first pair and the other reel of the second pair. Guide means maintain the first and second tapes in engagement with one another between spaced points located between the first and second pairs of reels and at least one of the reels is driven.

---

This application is a divisional application of copending application Ser. No. 312,221, filed Sept. 27, 1963, and entitled "Method for Processing Welding Wire," now U.S. Patent No. 3,210,838.

This invention relates to the processing of wire products, and is particularly concerned with methods and apparatus for cleaning welding wire—i.e., wire which is to be used in welding operations.

Various types of welding wire have previously been developed, and generally, prior welding wire has proved satisfactory for use in applications where only normal strength properties are required. However, with the advent of advanced scientific developments, such as, for example, space projects, there has been a growing need for welding which insures an ideal joint having the strength properties and physical characteristics of the material which is joined thereby. Furthermore, a welding wire which insures an ideal joint lends itself to use in more diverse welding applications, including applications where rivet joints and the like have previously been incorporated.

Accordingly, the primary object of the present invention is to provide methods and apparatus for cleaning welding wire which will render the ultimate wire so processed capable of yielding substantially perfect or ideal welded joints. To achieve this object, however, requires compliance with certain other specific objects of the invention, and to understand these other specific objects of the invention, it is necessary to first appreciate the defects in, or characteristics of, existing welding wire which prevent achieving the so-called "ideal" weld.

In making certain types of welding wire, as for example aluminum welding wire, it is conventional to extrude the aluminum in wire form, and to thereafter draw the aluminum so that the same obtains proper strength properties. Extrusion is but one method by which aluminum wire can be made, but still an extruded wire can serve as a basis for explaining defects which are commonly encountered.

In any metal extruding operation, the base material commonly is initially handled in ingot form. The ingots contain not only the major constituents, but also alloy constituents which render the ultimate extruded unit suitable for use in the particular application. In the case of aluminum, where ingots are used, it is common to find impurities even within closely controlled tolerances which can be met under commercial limitations. Thus, iron particles, silicone particles, earth particles (dirt), grease, carbon particles, and the like are often contained in the ingot. Moreover, once the ingot has been heated, and the wire is extruded therefrom, it is common to experience some segregation of alloying elements, some discontinuity of internal structure, some so-called "cold lapping" and some surface scratches.

The impurities and defects in the ingot appear to be comparatively minor because of the ingot size, but the wire which is extruded from the ingot has a small diameter or cross section, and accordingly, any impurity can be of major importance in the extruded wire, although only of minor significance in the original ingot. Moreover, the extruded wire, as indicated, is normally drawn and/or worked to impart the desired strength properties thereto, and thus a surface scratch in the originally formed extruded wire may be comparatively small, whereas after the drawing operation and the resulting further reduction of diameter or cross section, such scratch may be spread over a substantial area on the drawn product having a reduced diameter. The same considerations apply to segregation of the alloying elements, cold lapping and discontinuities in internal structures. In essence, a defect in the ingot often manifests itself as a major defect in the extruded aluminum wire, and the defect in the wire as initially extruded, often manifests itself as a substantially larger defect in the drawn wire forming the final product.

It is important that defects of the above described type be eliminated because as long as such defects remain, the ultimate weld will not be of uniform strength, nor free of porosity. (In wire otherwise formed, other defects of equal importance may be encountered.)

In addition to the physical properties and characteristics which are experienced with the wire, where the same is to be used in welding applications, the cleanliness of the peripheral surface of the wire is of major importance. Specifically, it is necessary to be certain that the surface of the wire is clean as possible, with all of the oxides and the residual moisture removed therefrom, so that there is an absence of gas pockets in an ultimate weld formed with the material, or any weak and spongy structure therein. In particular, it is desirable to eliminate any undesired surface deposit which appears as a hydride, since hydrides result in gas pockets in the weld, and consequent weak spongy structure thereof.

A basic object of the present invention is to provide a method and apparatus for cleaning the surface of the ultimately formed welding wire whereby the same is free of surface impurities. More particularly, it is a specific object of the present invention to provide such a method and apparatus which incorporates wiping means moving in an opposite direction from the wire and so arranged as to continuously present substantially clean wiping surfaces to the wire.

Aside from the foregoing more basic general and specific objects of the invention, there are certain additional objects hereof, which are of significance.

In regard to the processing of the welding wire so as to remove surface impurities therefrom, additional significant specific objects of the present invention include the following:

(a) The provision of a method and apparatus wherein the final cleaning operation is achieved so that clean fabric surfaces are constantly moving in wiping contact with the wire with continued processing of the wire;

(b) The provision of such a method and apparatus wherein the wiping surfaces in final contact with the wire are adapted to be impregnated with a coating solution whereby certain wires, such as for example steel wires, can have a coating applied thereto, such as for example, a rust preventive coating, after the surface thereof is otherwise completely cleansed;

(c) The provision of such a method and apparatus which completely removes from the wire not only detergent soluble impurities, but also grease soluble impurities;

(d) The provision of such a method and apparatus which is particularly effective in removing magnesium oxide and aluminum oxide from aluminum wires (such impurities being those which ordinarily cling to the wire and prove to be most troublesome);

(e) The provision of such a method and apparatus which insures an ultimate product free of peripheral moisture and either completely dry or coated with a desired coating material which is not troublesome in further use of the wire during a welding operation.

The invention has been found to have particular utility when used in the formation of aluminum welding wire, but it is to be understood that the same is applicable to titanium welding wire, magnesium welding wire, and other welding wires where the absence of internal defects, and surface cleanliness are of primary importance to uniformity and strength in the ultimate weld which is made with the wire being processed.

In accordance with the invention, initially formed and/or initially drawn wire is subjected to an internal defect sensing operation, and portions of the wire having defects therein are severed from the remaining wire. The remaining wire parts are joined together, as by welding, so that they remain as a continuous length. Such continuous length is then preferably processed through further drawing operations, preferably in opposite directions, and/or through other strength giving operations. Thereafter, the wire is scrubbed and washed so as to partially clean the surface thereof, and finally the surface of the wire is wiped by exposing the same to continuously moving surfaces.

These are but very basic features of the invention, and the invention itself, the wiping applications thereof, and the various phases thereof, will be better understood by reference to the following detailed description.

Such description makes reference to the accompanying drawings which present preferred and illustrative embodiments of the invention.

In the drawings:

FIGURE 9 is a fragmental view of one support section and cooperating drive means utilized in the arrangement of FIGURES 7 and 8;

FIGURE 10 is a side view of the arrangement shown in FIGURE 9;

Figure 1:
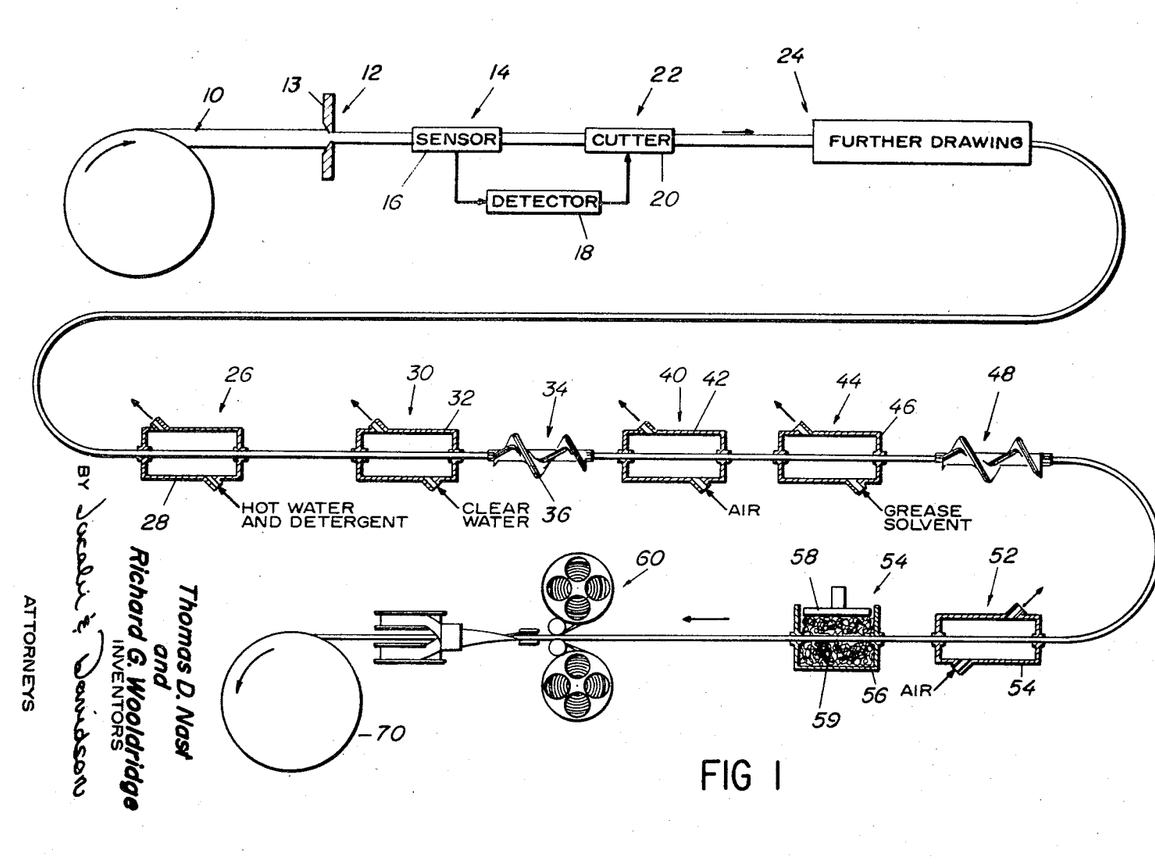
FIGURE 1 is a schematic view showing a series of processing stations utilized for handling welding wire in accordance with the invention.

In FIGURE 1, a roll of raw or rough wire stock 10 is shown as being disposed at the first of the processing stations. This stock 10, for example, can be extruded aluminum wire and for purposes of this description, the same is considered as such. However, as indicated above, the invention is applicable to wire otherwise formed, and to other wires than aluminum wire. Still, for convenience, it will be assumed that the wire 10 is rough extruded aluminum wire such as the end product of a conventional aluminum wire extruding machine.

The wire 10, as formed, has little strength and the same must be worked in order to impart the desired strength properties thereto. For this purpose, as also indicated above, it is conventional to pass the wire through a series of drawing stations wherein the wire is drawn, preferably, first in one direction and then in an opposite direction so as to achieve uniform strength and desired grain orientation.

In the arrangement of FIGURE 1, the rough wire is initially passed to a first drawing station 12 where a conventional drawing head 13 is disposed. Naturally, a drawing lubricant would be placed on the wire adjacent the drawing head 13 so that the drawing can be carried out effectively. In FIGURE 1, the lubricant depositing means, and the support for the drawing head, have been eliminated for purposes of simplicity, and because the operation will readily be understood by those familiar with the art.

After the wire which is being processed has passed the first drawing station 12 where some strength is imparted thereto, and where the diameter is somewhat reduced, then defects in the wire 10 are sensed in accordance with the invention.

Thus, as shown in FIGURE 1, a sensing station 14 is provided with a sensing means 16, which sensing means determines the existence of any defect in the wire. The output of the sensing means, as shown, is fed to a detector or detecting means 18 which is operatively linked with a cutter 20 disposed in the path of the wire 10 and located at the cutting station 22.

As explained more fully below, the sensor 16 serves to detect imperfections in the wire and in response thereto, the cutter 20 is operated to sever the wire so that a portion of its length may be removed from the entire length of the wire, with the remaining parts welded together to establish a continuous length ready for further processing.

Because of the need for uniformity in cross-sectional area of the wire and due to the necessity of defect-free wire, the welding operation is a conventional fusing process thereby doing away with an added material or weld to the wire.

Once the defects have been removed, the wire which leaves the cutter 22 is further processed, and if aluminum wire is being used, the same, for example, is subjected to further drawing operations as indicated at the station 24. These further drawing operations may be carried out on a multiple pass drawing machine, or through the use of separate drawing heads. In any event, as indicated, the drawing is preferably performed first in one direction and then in an opposite direction, so that the ultimate wire has uniform strength and grain orientation.

Although further drawing operations have been shown, it is to be understood that in certain instances, the wire may be further processed without being subjected to additional drawing operations, or without being "worked." Still, the wire which passes from the cutting station 22 is free of the defects there sensed and removed. Such wire, as either further processed or as it leaves the cutting station 22, can be wound on spools for the cleansing treatment to be described. Alternatively, the process can be carried out continuously, as indicated in FIGURE 1.

The defect-free worked wire is ready for its surface cleaning treatment following the final working operation. Of course, the surface treatment hereof, as will be apparent, can be used on wire which is not made in accordance with the above and wherein defects have not been sensed therein. Still for perfection, and in accordance with the preferred embodiment of the invention, wire processed, as indicated above, is utilized.

The processed wire first passes a washing station 26 where hot water and detergent are passed over the passing wire. The water and detergent solution is forced through the chamber 28 disposed at the station 26, countercurrent to the direction of the movement of the wire.

The wire which leaves the station 26 passes to a station 30 where water or other inert liquid is passed over it so as to rinse the wire. At the station 30, the rinsing solution is passed through the chamber 32, thus effecting removal of the detergent encountered at the station 26.

Figures 5, 6, 11:
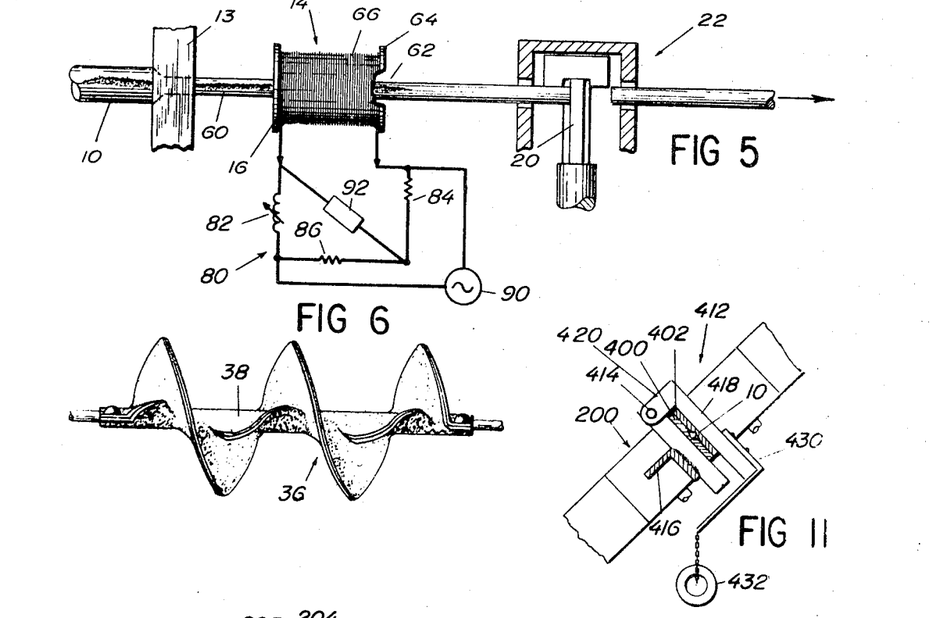
FIGURE 5 is a fragmental detailed view of the sensing and cutting elements utilized in the arrangement of FIGURES 3 and 4.
FIGURE 6 is a fragmental perspective view of a twisted wiping arrangement preferably utilized at certain wiping stations of FIGURE 1.
FIGURE 11 is a fragmental view, partially in section, of a guide means utilized in the apparatus of FIGURES 7 and 8; and, FIGURE 12 is a schematic view showing in some detail how the tape means of the apparatus of FIGURES 7 and 8 serves to wipe the entire periphery of a wire being processed through said apparatus.

The wire which leaves the station 30 has free surface impurities and detergent soluble impurities removed therefrom. However, to effect final removal of the impurities and to partially dry the wire, it passes from the station 30 to a wire wiping station 34 where a pair of twisted felts 36 are disposed. Such twisted felts, as shown in FIGURE 6, effectively form a helix having a central axis 38 through which the wire 10 passes. Such felts can easily be supported in position by spring means maintaining the felts in fixed position relative to the path of travel of the wire, whereby the wire travels between the twisted felts so as to have the surface thereof wiped thereby.

The wire which leaves the wiping station 34 passes to a drying station 40 where an air stream under high pressure is passed through the chamber 42, to remove the moisture from the surface of the wire, and otherwise dry the same. The air stream, here again, passes countercurrent to the direction of travel of the wire through the chamber 42.

The dried wire leaving the station 42 has all of the major impurities removed therefrom, but the same may retain certain grease films or spots thereon. Accordingly, the wire leaving the station 40 is passed to a station 44 where the same is washed with a grease solvent travelling countercurrent to the direction of the wire through the chamber 46. The grease solvent serves to remove the clinging grease impurities which may remain on the wire, so that essentially the wire which leaves the station 44 is cleaned, except for the grease solvent.

The wire then passes from the station 44 to another wiping station 48 where a pair of twisted felts 50 serve to wipe the wire in the same manner as the twisted felts 36. These twisted felts 50 are identical with the twisted felts 36, and the support and arrangement thereof corresponds with that used at the station 34. Accordingly, repetition of the felt wiping arrangement appears unnecessary.

The wire leaving the wiping station 48 is essentially clean but may have some moisture content thereon. To remove this moisture content, and completely dry the wire, it is passed to a further drying station 52 where air under substantial pressure is passed through the chamber 54 in a direction countercurrent to the direction of movement of the wire. The air current at the station 52 substantially removes the entire moisture content from the wire which is extremely clean at this time.

However, for perfect cleanliness, i.e., cleanliness of the so-called surgical grade, the invention contemplates certain further processing operations. To this end, the wire 10 which leaves the station 52 is passed to a wiping station 54 wherein waste cotton batting 59, or the like, i.e., a thread-like batting material with absorptive properties, is disposed in a container 56. The wire 10 passes through the material 59 which is maintained in contact with the wire through the use of a weighted lid 58 which moves vertically within the container 56 so as to continuously press the material 59 into engagement with the wire whereby the same effectively wipes the passing wire.

For a very short length of wire, the wiping operation performed at the station 54 may be sufficient, but with any continued operation, it would be necessary to change the material 59 at the station 54 in order to maintain the same clean, as each bit of wire 10 passing therethrough deposits some foreign material on the material 59. Certainly such change of material 59 in the container 56 would be more frequent if the wiping operation at station 54 was the last station for passage of the wire.

For continuous operation, however, the invention provides for utilizing a final wipe as at the station 60. Here, as explained more fully below, the surface of the wire is continuously exposed to comparatively fresh fabric material which is in engagement therewith and which finally removes the impurities therefrom. The clean wire is then wound on a takeup spool 70 which can easily comprise the spool on which the material is supplied to the ultimate consumer or distributor.

In handling certain wires, it may be desirable to provide a final coating thereon before winding the same on the takeup spool, and for this purpose, as also explained more fully below, the invention contemplates impregnating the wiping tapes used at the station 60 with a coating solution which is in turn "wiped-on" the wire being processed at the station 60.

Accordingly, a dispensing means 203 is suspended from above the wiping tapes 400, 402. The inverted bottle having a supply tube 205 connected thereto is provided with a droplet dispensing nipple 207 through which a coating solution passes. It should be understood that any conventional liquid dispenser could be used in place of the prescribed bottle. In those cases where the wire is to be used for outdoor welding, it may be desirable to coat the processed wire with a rust preventive. Of course, other and different solutions may be dispensed from the bottle.

A wire which has traversed the arrangement discussed above, and shown in FIGURE 1, is free of internal defects, surface defects and surface impurities. Accordingly, the same provides a uniform wire, free of porosity and having a strength compatible with the strength of the material being joined.

Having now described an overall processing sequence carried out in accordance with the invention, details of particular steps involved in such sequence can be intelligently considered.

*Sensing and cutting operation*

As best shown in FIGURE 5, the wire 10 which leaves the drawing head 13 has a reduced diameter, and is passed through the sensor 16 at the station 14, which sensor, comprises a coil of electrically conductive wire 66.

Coil 66 has an axial opening 62 therein, or more particularly, the spool 64 on which the wire strand is wound has a central opening 62 therein. Thus, the wire 10 which passes through the spool 64 effectively serves as a core for the coil 66. Any defect, such as the defect 60 in the wire 10 shown in FIGURE 5, renders the core of the coil nonuniform, and, accordingly, affects the magnetic field and inductance of the coil 66. More particularly, the inductance of the coil 66 varies with the existence of a defect, such as the defect 60 in the wire 10.

This variation in the inductance of the coil 66, or in the magnetic field created thereby, is utilized in accordance with the invention to effect the cutting operation. More specifically, as shown in FIGURE 5, the coil 66 is but one leg of an inductance-resistance bridge generally designated by the numeral 80. Such bridge includes as one leg the coil 66, the coil 82 as another leg, and as further legs, the respective resistors 84 and 86. The signal source 90 is coupled between a pair of branches of the bridge including, respectively, resistors 84 and 86 and inductances 82 and 66. The detector 92 is coupled across the bridge, so that the arrangement generally corresponds to that of a Wheatstone bridge. The bridge is initially balanced by adjustment of the variable inductance 82 with nondefective wire disposed in the coil 16. Thereafter, if a defect is experienced in the wire 10, the balance of the bridge is no longer maintained and the detector 92 senses the imbalance of the bridge.

Figure 2:
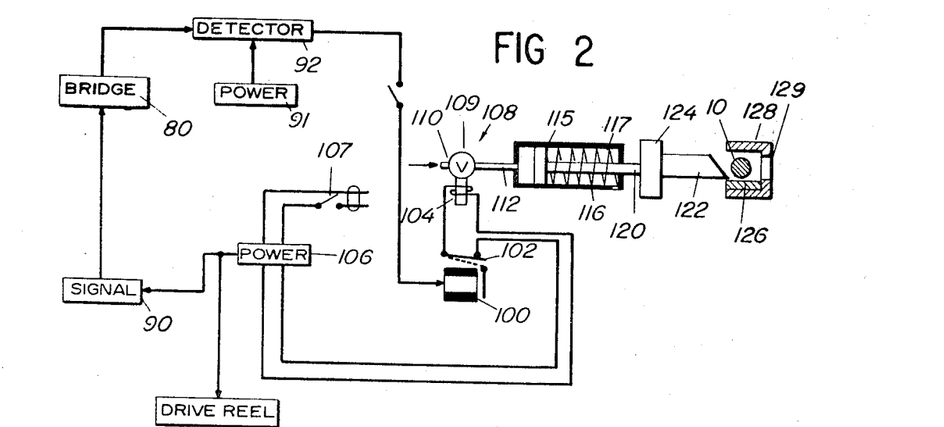
FIGURE 2 is a schematic view of the circuit arrangement and cooperating means used at the sensing and cutting station of FIGURE 1.

By referring to FIGURE 2, it will be seen that the basic arrangement essentially comprises the signal source 90, the bridge 80 and the detector 92. In essence, the signal source feeds a signal to the bridge, and the bridge in turn develops an output signal which is fed to the detector when a defect is encountered in the wire by the coil 66.

The common power source 106, energized by the switch 107, supplies power to the signal 90, bridge 80, and the drive reel 70, respectively. In the schematic showing of FIGURE 2, the detector 92 is provided with its individual power source 91, but could be easily supplied from the common power source 106 where desirable.

The mere sensing of a defect is not in itself sufficient because in handling the wire, one is not only concerned with whether or not a defect is in existence, but is further concerned with eliminating the defect so that the wire can be further processed. Thus, in accordance with the invention, the detector 92 is utilized to operate a cutting mechanism 22. More particularly, the detector 92 operates a relay 100 having a switching arm 102 which is moved in response to an output from the detector 92. When the switching arm 102 is moved to the position shown in FIGURE 2, the same establishes a circuit through a valve control 108 which is supplied with current from a power source 106. The coil 104 is the operating coil of a solenoid operated valve 109 and when current is passed through the coil 104, the valve 109 opens. In accordance herewith, air is fed under pressure into the line 110 and when the valve opens, such air passes through the line section 112 and into a cylinder 115. Disposed within the cylinder 115 is a piston 116 urged to the position shown by a spring 117. Leading from the piston 116 is a piston rod 120 which has a cutter blade 122 fixed on the end thereof by a suitable coupling 124.

When the relay switch arm 102 moves upwardly from the dotted line position shown, it closes the circuit through the coil 104, thereby opening the valve 109 and permitting the air under pressure to pass into the cylinder 114. As a result, the piston 116 moves to the right, as shown, thereby compressing the spring 117 and moving the knife 122 to the right as shown. The knife is guided within a channel 126 in a cutting housing 128 and passes through such housing and into the lateral opening 129 therein. The wire 10 passing through such housing is accordingly severed.

From the above, it will be understood that when a defect in the wire 10 is sensed by the coil 66, the bridge 80 is unbalanced and, accordingly, the detector 92 produces an output. This output activates the solenoid operated valve control 108 in the air supply lines 110, 112 to the cylinder 115, to open the valve 109. With opening of the valve, the piston 116 is moved to the right, thereby moving the knife across the path of the wire 10 and severing the wire. Thus, in response to sensing a defect in the wire, the cutter mechanism is operated to sever the wire.

Once the wire is severed, the operator immediately knows that a defect has been encountered. Accordingly, he cuts a short length of the wire from the continuous length, and he then welds together the adjacent ends of the remaining wire portions in the manner set forth above. The operation is then started until another defect is detected.

Preferably, the welding operation is carried out such that the welded joint must pass through the sensing mechanism. The welded joint in the wire at this point, is generally uniform with the remainder of the wire. Thus, sensing the welded joint would not affect the sensor so as to actuate the cutting mechanism. On the other hand, if the joint which is made in welding the parts together is not sufficient, or generally uniform, then the sensing mechanism and cutter mechanism again operate, whereby the wire is severed, and a new welded joint must be made.

In other words, by this procedure, not only are internal defects in the wire sensed, but once the wire is cut and a short portion severed therefrom, whereupon the parts are again joined together, the juncture of the joined parts is examined by the sensor.

Figure 3:
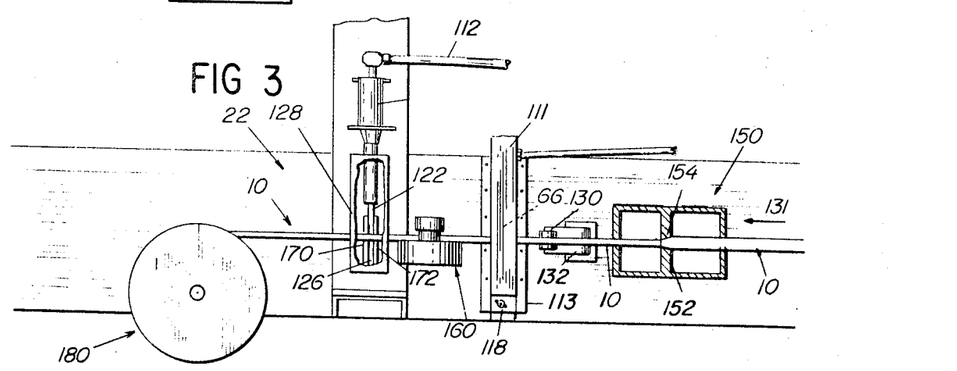
FIGURE 3 is a plan view of the structural assembly utilized in sensing a defect in the wire being handled and in severing the wire once the defect is sensed.
Figure 4:
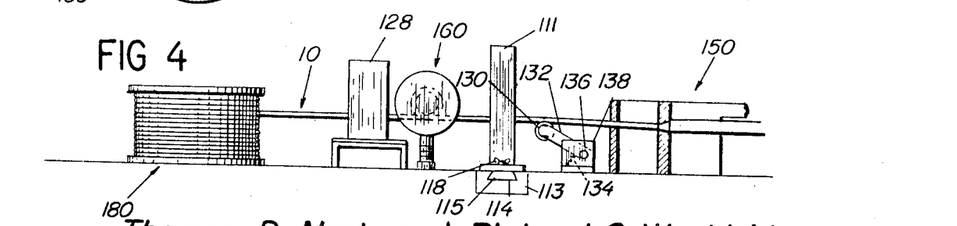
FIGURE 4 is a side view of the arrangement shown in FIGURE 3.

Bearing in mind the operations described above, attention can now be directed to FIGURES 3 and 4 which present the basic over-all structural arrangement incorporated preferably at the stations 14 and 22. In FIGURES 3 and 4, the sensing coil 66 is shown as being disposed in a support frame 111. This frame is itself supported by a slide track 113, which as shown in FIGURE 4, has a dovetail slideway 114 therein. The bottom of the support frame 112 carries a cooperating dovetail projection 119 which rides in the slideway 114. The frame 111 is thus laterally slideable with respect to the axis of travel of the wire 10, so as to permit the proper adjustment of the support 111 and in turn, the proper disposition of the coil 66. To this end, the support 111 carries a set screw or bolt 118 on one end portion thereof, which set screw or bolt, when tightened downwardly, abuts the slideway 114 to maintain the frame 111 in preset position.

To the right of the support 111 or in advance thereof with respect to the direction of travel of the wire 10 as shown by the arrows 131, a guide roller 130 is provided. This roller is supported in position by a pivotally mounted arm 132 which rotates about a pivot shaft 136. The pivot shaft 136 is supported in a bracket 138 and the spring 134 cooperates between the base of the bracket and the pivotally supported arm 132 to urge the roller 130 upwardly.

To the right or in advance of the support roller 130, a drum box 150 is incorporated. This box includes a drawing head support member 152 which has a drawing head 154 supported therein. The wire 10 passes through the drawing head 154 whereupon the diameter of the wire is reduced and thereafter passes over the roller 130 and then through the center of the coil 66. The wire which is leaving the coil 66 passes under a guide roller arrangement 160 and then through the cutting housing 128. The guide channel 126 is provided in the cutter housing 128 by a pair of bar members 170 and 172 cooperating with the base of the housing to define a reciprocating path receiving the lower edge of the cutter element 122.

The wire 10 which has passed the cutter station 22 can, if desired, and as shown in FIGURES 3 and 4, be wound upon a takeup spool 180 which rotates about a vertical axis. The wire can then be transferred to another location for subsequent working through drawing or like operation. Alternatively, the wire can be transported to another location for performing the washing and surface cleaning operations thereon. Still as another alternative, the wire can be continuously fed to the cleaning operation, as indicated in FIGURE 1.

Although a bridge-type sensing means has been shown in the drawings and described above, it should be appreciated that other types of sensing means can be utilized in accordance herewith. The bridge-type sensing means is preferred, however, because the same can be easily operated by a single source having a frequency in the audio range and preferably a frequency of between 3 kc. and 5 kc.

The particular form of relay, detecting means, signal source, and other electrical components which are utilized in the arrangements shown can be varied. However, generally conventional components are available for use in the combined assembly and arrangement and, therefore, it does not appear necessary to further consider the details of each component discussed.

Scrubbing, washing and wiping operations

The scrubbing, washing and wiping operations which are carried out at the stations 26, 30, 34, 40, 44, 48 and 52 can easily be performed in continuous sequence, as shown in FIGURE 1. Moreover, the particular chambers which are used at the stations 26, 30, 40, 44 and 52 need have no particular contour, nor any particular shape. However, such chambers preferably comprise cylindrical sections having an internal bore therethrough which is not particularly large, and which communicates with an inlet and an outlet, so as to permit the passage of air or fluid closely adjacent the wire and in contacting relation thereto to achieve the desired operations. The twisted felts utilized at the stations 34 and 48 have been found effective, but here again, the particular wiping operation can be performed by some other means.

The next to last wiping operation shown in FIGURE 1, i.e., the wiping operation carried out at the station 54, can be eliminated, if desired, although it has been found that best results are obtained if such station is used, because it does provide an effective wipe which eliminates a substantial part of undesired impurities appearing on the surface of the wire.

Insofar as the invention is concerned, final wipe at the station 60 is the most significant.

Tape wiping apparatus

Figure 7:
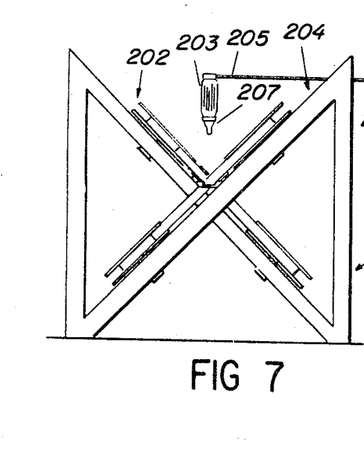
FIGURE 7 is an end view of an apparatus for providing an ultimate wipe and/or coat on a wire processed in accordance with the present invention.
Figure 8:
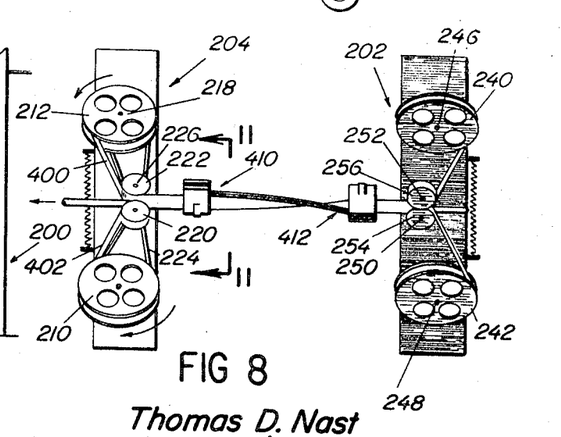
FIGURE 8 is a plan view of the apparatus shown in FIGURE 7.

As possibly best shown in FIGURES 7 and 8, the tape wiping apparatus provided in accordance herewith includes a frame generally designated by the numeral 200 which has a pair of support plates, generally designated by the numerals 202 and 204, supported thereon at right angles with respect to one another. The support plates 202 and 204 each carry a pair of reels and a pair of guide rollers.

More particularly, as shown in FIGURE 8, the support plate 204 carries a first pair of reels 210 and 212 thereon. Each of these reels is supported for rotation about the respective axes 216 and 218 which comprise a first pair of axes disposed parallel to one another. The guide rollers 220 and 222 are similarly supported for rotation about respective axes 224 and 226 which are parallel to the axes 216 and 218.

The reel and guide roller assembly incorporated on the support plate 202 generally corresponds with that incorporated on the support plate 204. A pair of reels 240 and 242 rotatably supported about respective axes 246 and 248 are mounted on the support plate 202. The axes 246 and 248 are parallel to one another, and are also parallel to the axes 250 and 252 about which another pair of guide rollers 254 and 256 are respectively rotatable.

Figures 9, 10, 12:
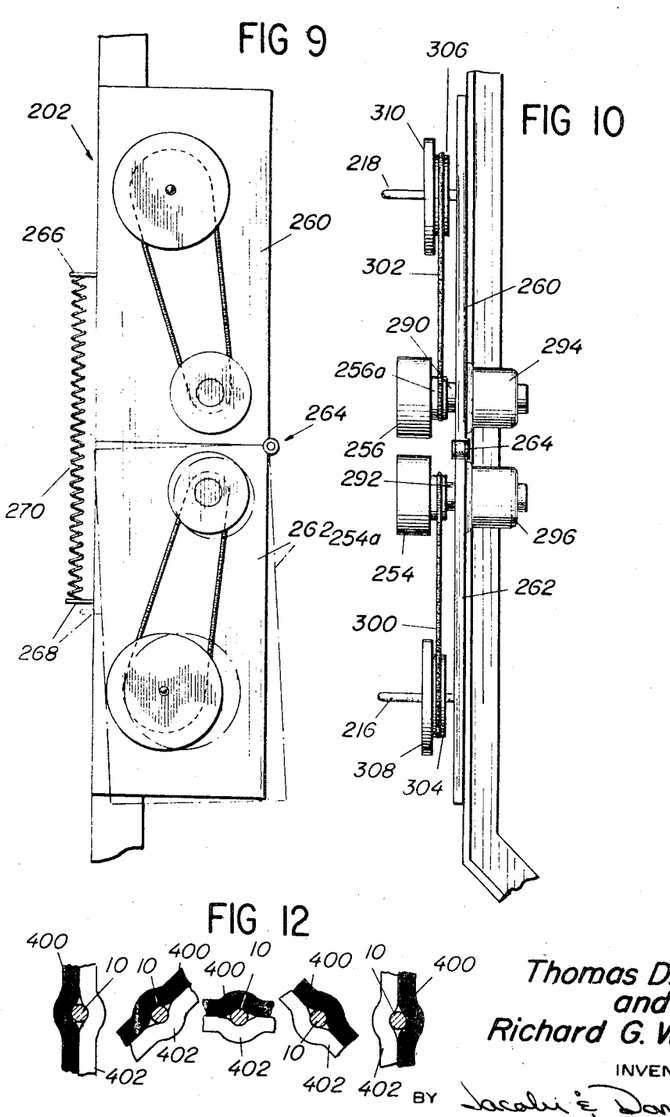

As best shown in FIGURE 9, the support plate 202 includes an upper plate member 260 and a lower plate member 262. The lower plate member 262 is hingedly supported as by the hinge 264 to the comparatively fixed plate member 260. Thus, the plate member 262 is rotatable counterclockwise, as shown in FIGURE 9 by the dotted line position. In order to bias the plate members to their normal abutting position, plate member 260 carries a forwardly projecting flange 266 and plate member 262 carries a forwardly projecting flange 268. A spring 270 is coupled between the respective flanges 266 and 268 so as to normally maintain the plate member 262 in longitudinal alignment with the plate member 260.

As shown in FIGURE 10, the guide rollers 254 and 256 are carried on the forward side of the plate members 260 and 262 and at the end of the respective shafts 290 and 292 which extend from drive motors 294 and 296. The drive motors 294 and 296 are preferably induction-type full speed motors, which are mounted on the rear of the respective plate members 260 and 262. Each of the guide rollers 254 and 256 carries a belt receiving pulley 254a and 256a, respectively, at the base thereof and in surrounding relation to the respective shafts 292 and 290. Such drive pulleys receive the respective drive belts in the form of spring belts 300 and 302. These belts extend from the drive pulleys to the pulleys 304 and 306 carried on the underside of the reel supporting disks 308 and 310. The reel supporting disks 308 and 310 and the pulleys 304 and 306 secured thereto are rotatably mounted on stub shafts 216 and 218, which stub shafts are adapted to receive the aforementioned reels thereon.

With the above arrangement, when the reels are supported on the respective shafts 216 and 218, the reels are driven simultaneously with the guide rollers from the respective motors 294 and 296 and through the respective drive belts 300 and 302.

Notwithstanding the fact that FIGURES 9 and 10 have presented the details of the support plate 202, the reels, the guide rollers, and the motors carried thereby, and the pivotal connection between the respective plates thereof, the assembly utilized with the support plate 204 corresponds to that described for the support plate 202. Accordingly, repetition of such arrangement appears unnecessary.

Again referring to FIGURES 7 and 8, it will be noted that the respective support plates 202 and 214 are disposed in spaced relation to one another on the frame 200. Moreover, as indicated above, the respective support plates are angularly disposed with respect to each other, preferably at a 90° angle.

Each of the reels 210, 212, 240 and 242 are adapted to receive a fabric tape thereon. Specifically, the fabric tape 400 passes from the reel 212 over the guide roller 222, over the guide roller 256, and onto the reel 240. Similarly, a fabric tape 402 passes from the reel 202 over the guide roller 220, over the guide roller 254 and onto the reel 242. The direction of travel of the respective tapes 400 and 402 is opposite the direction of travel in which a wire would be passing the wiping station 60. However, during the passage of the tape between the respective pairs of reels, there is a twisting of the tape due to the angular disposition of one set of reels with respect to the other set of reels.

To maintain the twisting at the proper angle and to insure the proper tension on the tape, a pair of auxiliary guide means are utilized. These auxiliary guide means are generally designated by the numerals 410 and 412 in FIGURE 8. However, the detailed construction thereof is best shown in FIGURE 11. By referring thereto, it will be noted that the auxiliary guide means 412 includes a fixed plate member 414 secured to the frame 200 by means of a bracket 416. A second plate member 418 is pivotally supported by the rearwardly extending arm 420 to the plate member 414 whereby the plate member 418 is moveable counterclockwise, as shown, away from the plate member 414. To normally urge the plate member 418 toward the plate member 414, a bracket arm 430 extends from the base thereof to the left as shown in FIGURE 11, and a weight 432 is supported at the free end of the bracket arm 430. With this arrangement, the weight 432 serves to bias the plate 418 toward the plate 414. Such plates have the respective tapes 400 and 402 travelling therethrough, and accordingly, such plates serve to maintain the tapes in facing engagement with one another and thereby in engagement with the wire 10 being wiped thereby.

The two sets of auxiliary guide means 410 and 412 are identical and, thus, while only the guide means 412 has been described, it will be understood that the construction of the guide means 410 corresponds thereto.

The inner face of each of the fixed plates of each of the auxiliary guide means 410 and 412 are disposed angularly with respect to one another. It has been found that the inner face of the fixed plate members of these inner guide means should have an angle therebetween which is of the order of 10° to 15° less than the angle between the respective support plates 202 and 204. Specifically, if the support plates are disposed at an angle of 90° with respect to one another, then preferably the auxiliary guides or the inner faces of the fixed plate members thereof have an angle of the order of 70° to 80° therebetween, but with such inner faces lying equally within the angle between the support plates 202 and 204.

Due to the angular disposition of the respective reels, the respective guide rolls, and the auxiliary guides, the tapes 400 and 402 are twisted 180° as they pass from a reel in one pair of reels to a reel in the other pair of reels—i.e., as the tapes pass from one support plate to the other support plate. This action, as shown in FIGURE 12, results in wiping the entire periphery of a wire 10 passing between the tape members 400 and 402 so that the same is thoroughly cleansed. The tape members can move substantially slower than the speed at which the wire travels to achieve sterile cleanliness because the material removed from the wire is relatively small and the important point is that a comparatively clean surface is always presented to the wire so as to sufficiently remove impurities therefrom.

It has been found preferable to drive all of the reels and all of the guide rolls to maintain the proper tension on the tape and eliminate any stretching or dragging thereof. However, if desired, the takeup reels on the support plate 202 could be driven, with a suitable balancing-breaking arrangement provided for the reels on the support plate 204, so as to maintain the same free to unwind, while still maintaining proper tension under the action of the driven takeup reels.

After reading the foregoing description of the preferred and illustrative embodiments of the invention, it should be apparent that the objects set forth at the outset of the present specification have been successfully achieved.

Accordingly, what is claimed is:

1. In a method of cleaning welding wire, the improvement which comprises wiping the wire with a pair of fabric tapes moving both axially of the wire and circumferentially thereof.

2. A method of cleaning welding wire, which method includes the steps of washing and drying the welding wire, the improvement which comprises wiping the washed and dried welding wire by:
 (a) passing the welding wire in a given direction through a wiping station;
 (b) moving fabric tapes in engagement with opposite peripheral portions of said wire in a direction opposite said given direction and at said wiping location;
 (c) causing said fabric tapes to twist during their engagement with said welding wire.

3. A method of cleaning the surface of welding wire, said method comprising the steps of:
 (a) washing the wire with a detergent solution;
 (b) rinsing with an inert liquid the wire which has been washed with said detergent solution;
 (c) wiping the wire which has been rinsed with said inert liquid;
 (d) subjecting the wiped wire to a drying inert gas stream;
 (e) washing the wire which has passed said inert gas stream with a grease solvent solution;
 (f) wiping the wire which has been washed with the grease solvent solution;
 (g) subjecting the wire which has been wiped of the grease solvent solution to another inert gas stream; and,
 (h) wiping the wire which has been subjected to the last-mentioned gas stream with a pair of fabric tapes moving both axially of the wire and circumferentially thereof.

4. Apparatus for wiping the periphery of wire, said apparatus comprising:
 (a) a pair of elongate fabric tapes;
 (b) means for moving said tapes in facing engagement between a pair of spaced locations; and,
 (c) means for twisting said tapes as they move in facing engagement between said locations.

5. The apparatus defined in claim 4 wherein said means for twisting said tapes include means for guiding said tapes through a 90° and 180° twist between said locations.

6. Apparatus for wiping the periphery of wire, said apparatus comprising:
 (a) a pair of elongate fabric tapes;
 (b) means for moving said tapes in facing engagement between a pair of spaced locations;
 (c) means for twisting said tapes as they move in facing engagement between said locations; and,
 (d) means for moving a wire between said locations between said tapes.

7. Apparatus for wiping the periphery of wire, said apparatus comprising:
 (a) a frame;
 (b) a first pair of reels mounted on said frame in spaced apart relation to one another, said reels being rotatable, respectively, about a first pair of parallel axes;
 (c) a second pair of reels mounted on said frame in spaced relation to one another and in spaced relation to said first pair of reels;
 (d) said second pair of reels being rotatable, respectively, about a second pair of axes parallel to one another, said second pair of axes being disposed substantially perpendicularly to said first pair of axes;
 (e) a first tape extending between one reel of said first pair of reels and one reel of said second pair of reels so as to be, respectively, wound thereon and unwound therefrom;
 (f) a second tape extending between the other reel of said first pair of reels and the other reel of said second pair of reels so as to be respectively wound thereon and unwound therefrom;
 (g) guide means for maintaining said first and second tapes in engagement with one another between spaced points located between said first pair of reels and said second pair of reels; and,
 (h) power means for driving at least one reel in each pair of reels.

8. The apparatus defined in claim 7, wherein said guide means comprises a first pair of guide wheels and a second pair of guide wheels, means mounting said first pair of guide wheels for rotation about spaced axes parallel to said first pair of axes and with said guide wheels disposed to receive said first and second tapes respectively from said first pair of reels; a second pair of guide wheels, means mounting said second pair of guide wheels for rotation about axes disposed parallel to said second pair of axes and with said second pair of guide wheels disposed to guide tapes respectively onto said second pair of reels, and wherein said second pair of wheels are driven by said power means.

9. The apparatus defined in claim 8, wherein said guide means further includes a pair of spaced guide assemblies disposed between said spaced points at an acute angle with respect to one another, said assemblies defining passages for maintaining a twist in said first and second tapes passing therethrough.

10. The apparatus defined in claim 9, wherein one reel of each pair of reels is supported for pivotal movement with respect to the other reel of its pair, and wherein said apparatus incorporates means for biasing said one reel of each pair of reels with respect to the other reel of its pair of reels to maintain tension on said first and second tapes.

No references cited.

MORRIS O. WOLK, *Primary Examiner.*

B. S. RICHMAN, *Assistant Examiner.*

U.S. Cl. X.R.

15—88, 102; 134—15, 26, 37, 40